United States Patent [19]

Wang

[11] Patent Number: 4,577,986

[45] Date of Patent: Mar. 25, 1986

[54] JOINT MECHANISM FOR FOLDING LADDERS, FURNITURE AND THE LIKE

[76] Inventor: Chien-Yuan Wang, No. 17, Alley 6, Lane 24, Pa Te Rd., Sec. 4, Taipei, Taiwan

[21] Appl. No.: 532,096

[22] Filed: Sep. 14, 1983

[30] Foreign Application Priority Data

Jan. 20, 1983 [JP] Japan .......................... 58-007041[U]

[51] Int. Cl.⁴ ...................... F16C 11/00; E05D 11/10
[52] U.S. Cl. ......................................... 403/93; 403/95; 182/163; 16/332; 16/334; 16/349
[58] Field of Search ................ 403/95, 93, 102, 96, 403/328, 322; 297/367, 365; 182/163, 164; 16/332, 334, 349, 344, 325, 324

[56] References Cited

U.S. PATENT DOCUMENTS

| 986,772 | 3/1911 | Simpson | 403/93 |
| 3,412,420 | 11/1968 | Secherson | 16/324 |
| 3,731,342 | 5/1973 | Cousin | 16/349 |
| 3,955,240 | 5/1976 | Schuh et al. | 403/93 |

FOREIGN PATENT DOCUMENTS

| 2052584 | 10/1970 | Fed. Rep. of Germany . | |
| 2370885 | 9/1978 | France | 403/96 |

Primary Examiner—Cornelius J. Husar
Assistant Examiner—Peter M. Cuomo
Attorney, Agent, or Firm—Burns, Doane, Swecker & Mathis

[57] ABSTRACT

A joint mechanism comprised of two pivotally connected joint members rotatable about a common axis is lockable in one of a series of predetermined positions by engagement of a spring-biased pawl provided within one joint member within notches distributed about the peripheral edge of the other joint member. An operating lever comprised of a forked release element and a handle pivotally connected together cooperates with a control means to control locking and unlocking of the joint mechanism. The control means has radially extending resilient arms formed at the free end with upturned claws which, when projecting through slits formed in one side of the other joint member, prevents engagement of the pawl within said notches, and which, when being depressed into said slits by the release element of the operating lever, permits engagement of the pawl within the notches.

4 Claims, 10 Drawing Figures

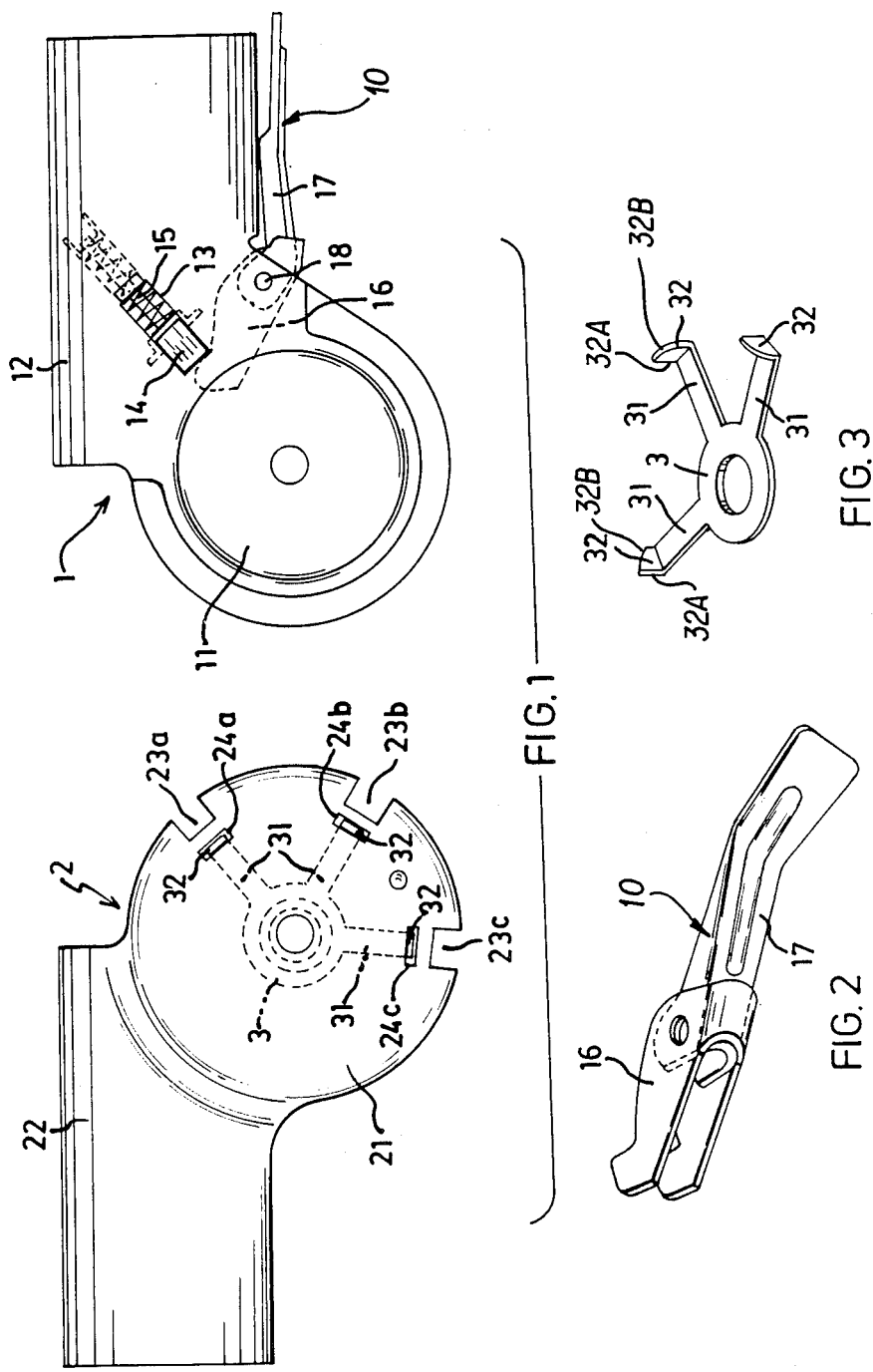

JOINT MECHANISM FOR FOLDING LADDERS, FURNITURE AND THE LIKE

BACKGROUND OF THE INVENTION

The present invention relates to joints for folding ladders, furniture and the like, and more particularly, to a joint mechanism for pivotal connection of ladder or furniture sections which permits the associated sections to be freely folded or unfolded, positionally adjusted, and locked in a predetermined angular position.

Known joints for folding ladders which are pivotable, angularly adjustable, and lockable are disclosed, for example, in West Germany Pat. No. 2052584 to Hoffman. This type of joint comprises a first joint member and a second joint member which are pivotally connected together. The first joint member has at its front end two spaced-apart, symmetrically arranged disks between which there are provided a spring-loaded locking element and an operating lever. The rear end of the first joint member is a tubular portion adapted to fit around one end of one ladder section. The second joint member has at its front end a hollow, flat locking disk formed of a pair of circular shell halves encasing a spring-biased sector-shaped ratchet, and at its rear end a tubular portion adapted to be connected to the other ladder section. Distributed about the circumferential edge of the locking disk are notches engageable with the locking element of the first joint member for selectively locking the ladder in one of a series of predetermined positions. The locking disk of the second joint member is sandwiched between the two disks of the second joint member, and a joint pin is provided to secure these disks together in such a manner that the first and second joint members can pivot relative to each other about the pin. In the joint of such construction when the operating lever is operated to cause disengagement of the locking element from its associated notch, the sector-shaped ratchet provided in the second joint member will close that notch to prevent return of the locking element into same while uncovering the notch at the desired position for the ratchet to engage. That is, upon shifting of the lockable positions or folding and unfolding of the ladder sections, the ratchet acts to permit or hinder engagement of the locking element in the respective notches by uncovering or closing the appropriate notch. However, since the ratchet is formed with peripheral teeth each of which projects outwardly of the joint through a notch, the outwardly projecting teeth tend to cause injuries such as a scratch to the user or to become caught on clothing. In addition, such teeth may result in malfunction of the joint due to susceptibility to damage when encountering impacts or external forces. Moreover, since the locking disk of the second joint member is constructed of two symmetrically superposed shell halves of sheet metal, it will be rather cumbersome to assemble the ratchet and the spring for biasing the ratcher within the locking disk during the manufacturing process.

Accordingly, the present invention overcomes the abovementioned disadvantages by providing an improved joint mechanism which insures safety in use while being easy to operate.

It is an object of the invention to provide a joint mechanism which has no unduly protruded parts which may result in injuries to the user or become caught on clothing.

It is another object of the invention to provide a joint mechanism which is easy to manufacture and assemble and free from malfunction in use.

It is still another object of the invention to provide a joint mechanism which employs a clawed control means entirely received within the joint mechanism and including a plurality of resilient arms in place of the conventional sector-shaped ratchet, and an operating lever constructed in two pivotally related sections in place of the conventional one-piece operating lever, the operating lever cooperating with the clawed control means to control movement of a pawl between its locking and releasing positions so as to adjust and lock the joint mechanism in one of a series of predetermined positions.

BRIEF DESCRIPTION OF THE DRAWINGS

Other objects and features of the present invention will become apparent from the following description taken in connection with the accompanying drawings wherein:

FIG. 1 is a plan view of two joint members of a disassembled joint mechanism in accordance with the invention;

FIG. 2 is a perspective view of an operating lever in accordance with the invention;

FIG. 3 is a perspective view of a clawed control means cooperable with the operating lever shown in FIG. 2;

DETAILED DESCRIPTION OF A PREFERRED EMBODIMENT OF THE INVENTION

Figure 4:
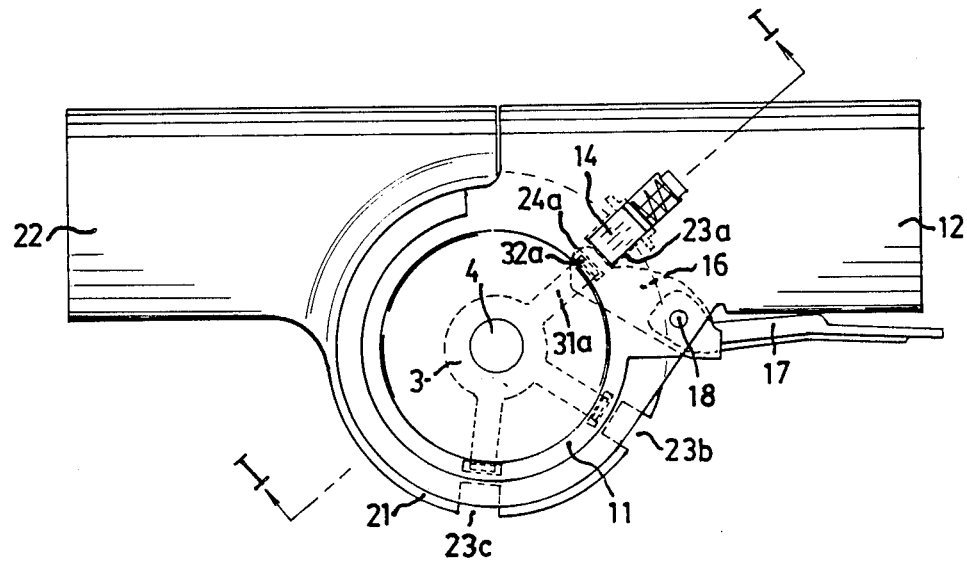
FIG. 4 is a plan view showing the joint mechanism fully extended in a straight line.
Figure 8:
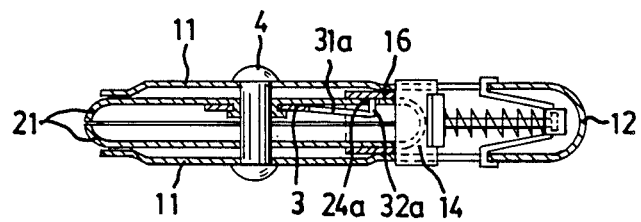
FIG. 8 is a longitudinal sectional view taken on line I—I of FIG. 4.

Referring now to FIG. 1, the joint mechanism of the invention comprises a first joint member 1 and a second joint member 2. As illustrated in FIGS. 4 and 8, the first joint member 1 grasps the second joint member 2 and is connected with the latter by a common axial pin 4 such that both joint members can pivot about the pin 4 relative to each other.

The first joint member may be formed in conventional manner, i.e., it may be made by sheet metal pressed into predetermined configuration. In this embodiment the first joint member is formed at its front end with a disk-shaped portion 11 composed of two spaced-apart, symmetrically arranged disks from which extends a substantially flat tubular portion 12 containing in opposite sides thereof two rectangular slots 13 extending towards the center of the disk-shaped portion 11. Slidably supported at both ends through the slots 13 is a bricklike pawl 14 which is spring-biased towards the disk-shaped portion 11 by a spring 15. A manually operated operating lever 10 is pivotally connected to the first joint member 1 by a pivot pin 18 disposed at a lower point between the disk-shaped portion 11 and tubular portion 12 of the first joint member. As best illustrated in FIG. 2, the operating lever is composed of a forked pawl actuating release element 16 engageable with the aforesaid pawl 14 and a handle 17 which is pivoted to the forked element 16 and in its inactive position fits against the underside of the tubular portion 12 of the first joint member.

Figure 9:
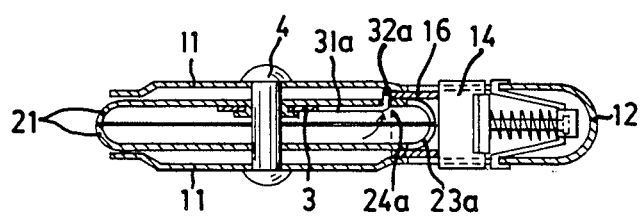
FIG. 9 is a longitudinal sectional view taken on line II—II of FIG. 5.

The second joint member 2, also formed of sheet metal by pressing, comprises a flat, hollow locking disk 21 at its front end and an integrally formed flat tubular portion 22 at its rear end. The locking disk 21 is provided with circumferentially distributed notches 23a, 23b and 23c in its closed peripheral edge. As shown in FIGS. 8 and 9, internally of the hollow locking disk 21 there is provided a clawed control means 3 rivetted to a side wall of the locking disc 21 by means of a flange around a bore for receiving the aforesaid pin 4 in the locking disk 21. The clawed control means 3, best illustrated in FIG. 3, is a ring provided with radially extending resilient arms 31 (equal in number to the notches) each of which has its free end upturned to form a finger or claw 32 shaped like a quadrant. Each claw 32 is disposed at right angles to its arm 31 and engaged within a slit 24a, 24b, 24c located adjacent to its corresponding notch 23a, 23b, 23c. When in their normal released position, i.e., not being depressed inwardly with respect to the locking disk against their elasticity, the claws project through the respective slits 24a, 24b, and 24c.

As shown in FIG. 8, the locking disk 21 of the second joint member 2 is sandwiched between the two disks of the disk-shaped portion 11 of the first joint member and is concentrically connected to the latter by the pin 4 so that both joint members are rotatable about the pin 4.

When the joint mechanism is fully extended, i.e., when the tubular portions 12 and 22 of the respective joint members are disposed in alignment as seen in FIGS. 4 and 8, the pawl 14 is engaged within the notch 23a while the forked release element 16 of the operating lever 10 straddles the locking disk 21 between the disk-shaped portion 11 and the locking disk 21 and is rotatably supported on the pivot pin 18. Since the forked release element 16 is in constant contact with the springbiased pawl 14, in the embodiment shown in FIG. 8 the forked release element is so urged by the pawl 14 that the inside of the upper prong of the forked release element will depress the the claw 32a against the resilient action of the clawed control means into the slit 24a in the locking disk 21 of the second joint member 2 and simultaneously close the slit 24a. Since projection of the claw 32a through the slit 24a is prevented because of the downward inclination deformation of the depressed arm 31a of the clawed centrol means 3 as shown in FIG. 8, the pawl 14 can be maintained in locking engagement with the notch 23a. Meanwhile, under the clockwise force exerted by the springbiased pawl 14, the release element 16 of the operating lever 10 causes the handle 17 to abut the underside of the tubular portion 12 to keep the first and second joint members aligned with each other and locked in position.

Figure 5:
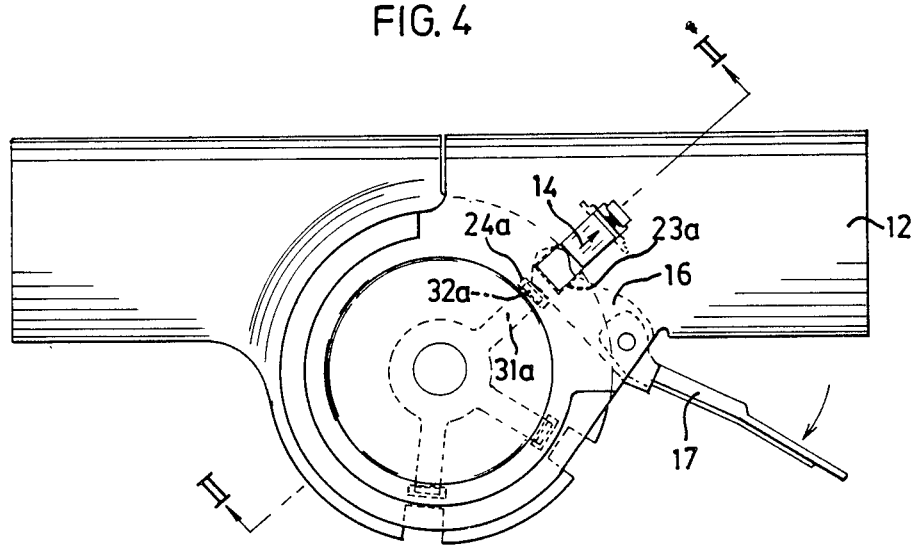
FIG. 5 is a plan view showing the joint mechanism in operation.

Adjustment of the relative angular position of the first and second joint members can be achieved simply by swinging the operating lever 10 relative to the tubular portion 12 of the first joint member. As shown in FIGS. 5 and 9, upon swinging of the handle 17 of the operating lever 10 in the sense as indicated by the arrow (clockwise as shown), the release element 16 will pivot about the pivot pin 18 against the resistance of the spring 15 to lift the pawl 14 out of the notch 23a along the slots 13, thereby freeing the locking disc 21 from the pawl. Upon disengagement of the pawl 14 from the notch 23a, the release element 16 of the operating lever 10 also moves away from the slit 24a to uncover same, thus permitting the claw 32a of the arm 31a to snap back to its normal released position in which the outwardly projecting claw 32a prevents inward sliding movement of the release element 16 towards the slit 24a and hence, engagement of the pawl 14 within the notch 23a. Under such circumstances the joint mechanism is in its released or unlocked position, allowing pivoting of the first and second joint members relative to each other to another lockable position desired.

Figure 6:
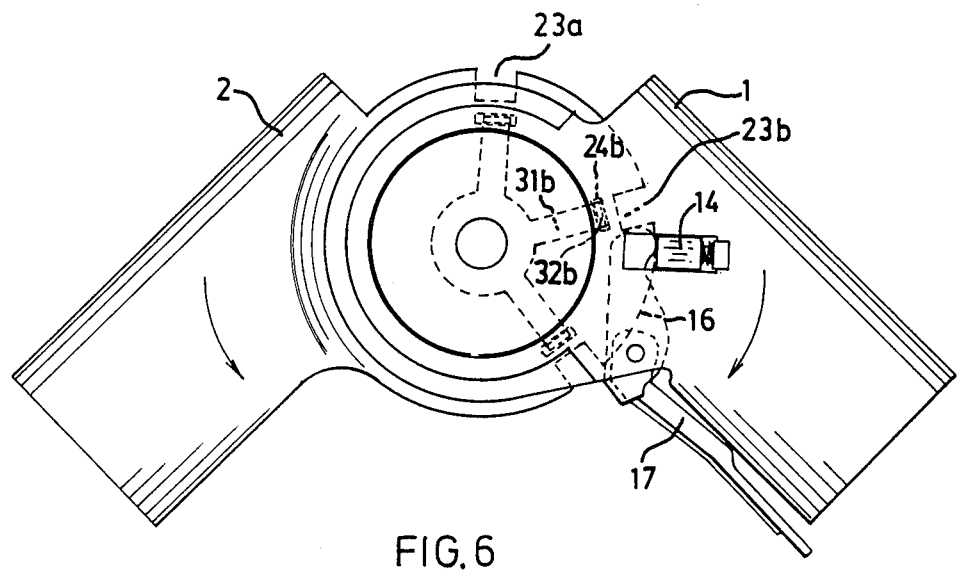
FIG. 6 is a plan view showing the joint mechanism in its released position.
Figure 7:
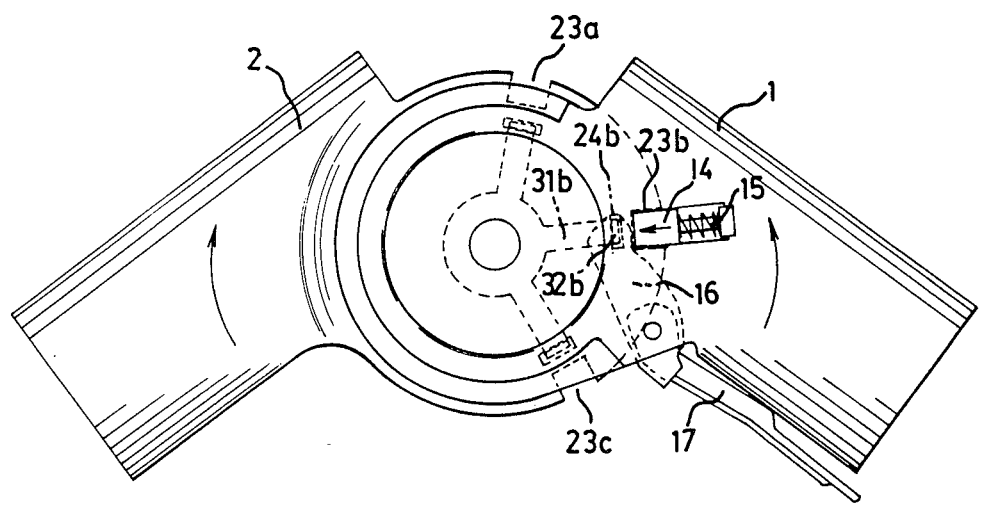
FIG. 7 is a plan view showing the joint mechanism locked in one of a series of predetermined positions.
Figure 10:
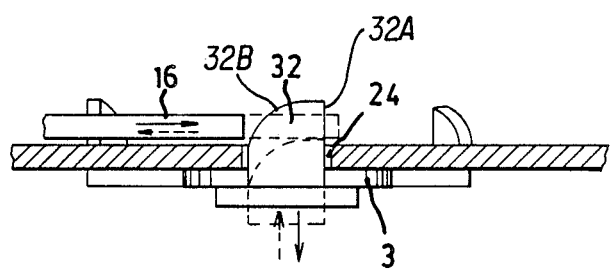
FIG. 10 is a schematic illustration of the working relationship between the clawed control means and the operating lever.

With reference to FIG. 6, when the first and second joint members are operated to pivot on the pin 4 in the directions indicated by the arrows, respectively, the pawl 14 is caused to move with the first joint member along the periphery of the locking disk 21 and towards the next notch 23b while a stop surface 32A of the claw 32b projecting through the slit 24b will prevent inward movement of the release element 16 of the operating lever 10 and hence, engagement of the pawl 14 within the notch 23b. Thus, the pawl 14 will not fall into but pass over the notch 23b upon further pivoting movement of the first and second joint member. Referring to FIG. 7, when the first joint member is operated to pivot counterclockwise, the clockwise downward curving of the quadrantshaped claws (see FIGS. 3 and 10) makes it possible for the release element 16 to engage a cammable surface 32B of the claw 32 to depress the outwardly projecting claw 32 (or 32b) against the resistance of the arm 31b into the slit 24 (or 24b), and the pawl 14 is moved back to a position corresponding to the notch 23b. At this moment, since there is no longer projecting obstacle to the movement of the release element 16, the pawl 14 will be urged by the spring 15 into the notch 23b to thereby lock the joint mechanism in this second predetermined lockable position. The same procedures as described above may be repeated to adjust the angular position of the joint mechanism to the third lockable position as represented by the notch 23c.

According to the invention, when the joint mechanism is locked in any one of the abovementioned predetermined lockable positions, and the operating lever 10 is rotated to disengage the pawl 14 from its associated notch 23 with a concomitant uncovering of the corresponding slit 24, the corresponding claw 32 will spring back and project through the slit, so that the pawl 14 is maintained by the release element 16 in its released position permitting pivoting of the first and second joint members for purposes of position adjustment. Locking of the joint mechanism in one of the predetermined angular positions can be effected by first turning downward the first joint member until the pawl 14 moves past the selected notch, and then turning the first joint member in an opposite sense so that the claw projecting through the slit adjacent to the selected notch is depressed entirely into the locking disk 21 by the release element 16 at the operating lever 10 to allow the pawl to engage the selected notch.

In contrast to the previously described conventional ratchet whose teeth project through the periphery of its associated disk, the clawed control means of the invention operates within the joint mechanism and therefore will eliminate the risk of being caught on clothing and injuries to the user. Furthermore, since the operating lever is composed of a release element and a handle which are pivotally related in such a manner that downward pivotal movement of the handle will give rise to corresponding movement of the release element but upward pivotal movement of the handle will not be transmitted to the release element, the handle can always be kept close to the associated tubular portion of the first joint member. This enables the user to hold tight both the tubular portion and the handle without needing to worry about whether his fingers will be clamped therebetween. Accordingly, the invention has the particular advantage of safety over the conventional joint, in addition to being simple in construction, free from frequent malfunction, and easy to assemble.

What is claimed is:

1. A joint mechanism comprising:
   a first joint member including
      a disk-shaped portion comprising a pair of opposing, spaced apart disk members,
      a tubular portion extending from said disk-shaped portion and including a pair of opposing, spaced apart sides in each of which is formed a slot,
      a pawl slidably supported in said slots,
      spring means for biasing said pawl in a first direction,
      a pivotable operating lever including a manually actuable handle portion and a pawl-actuating portion engageable with said pawl when said handle portion is actuated, for pushing said pawl opposite said first direction against the bias of said spring,
   a second joint member mounted to said first joint member for relative rotation about an axis of rotation, said second joint member comprising
      a hollow locking disk element including a plurality of circumferentially spaced notches on its outer periphery, said disk element disposed between said disk members and being connected thereto by a pivot pin defining said axis of rotation, said pivot pin extending centrally through said disk element and said disk members such that relative rotation between said disk element and said disk members sequentially orients said pawl in alignment with said notches, said disk element including a plurality of slits situated adjacent respective ones of said notches and extending through said disk element,
      a control member mounted on said disk element and including a plurality of fingers projecting through respective ones of said slits so as to emerge beyond a side of said disk element, each of said fingers including a stop surface and a cammable surface, said stop surface being engageable with said lever when said pawl approaches the associated notch from a first direction, to block movement of said pawl into such notch, said cammable surface being engageable with said lever when said pawl approaches the associated notch from a second direction such that said finger is cammed into its slit to permit the pawl to enter the respective notch, and
      a tubular portion extending from said disk element.

2. A joint mechanism according to claim 1, wherein said handle portion of said lever is pivotably connected to said pawl-actuating portion so that the handle portion can be rotated to a position against said tubular portion of said first joint member during relative rotation between said joint members.

3. A joint mechanism according to claim 2, wherein said pawl-actuating portion comprises a fork-shaped member.

4. A joint mechanism according to claim 1, wherein said control member comprises a ring having radially outwardly projecting resilient arms said ring being mounted on said pivot pin, and said arms carrying said fingers at their outer free ends.

* * * * *